(12) United States Patent
Ahrens et al.

(10) Patent No.: US 8,280,858 B2
(45) Date of Patent: Oct. 2, 2012

(54) STORAGE POOL SCRUBBING WITH CONCURRENT SNAPSHOTS

(75) Inventors: Matthew A. Ahrens, San Francisco, CA (US); Mark J. Maybee, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 643 days.

(21) Appl. No.: 12/494,090

(22) Filed: Jun. 29, 2009

(65) Prior Publication Data

US 2010/0332446 A1  Dec. 30, 2010

(51) Int. Cl.
G06F 7/00 (2006.01)
G06F 17/00 (2006.01)
G06F 17/30 (2006.01)
G06F 15/16 (2006.01)

(52) U.S. Cl. .......................... 707/692; 707/657; 707/790

(58) Field of Classification Search .................. 707/692, 707/657, 790
See application file for complete search history.

(56) References Cited

U.S. PATENT DOCUMENTS

| | | | |
|---|---|---|---|
| 4,144,522 A | 3/1979 | Kageyama et al. |
| 5,129,085 A | 7/1992 | Yamasaki |
| 5,155,847 A | 10/1992 | Kirouac et al. |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,819,292 A | 10/1998 | Hitz et al. |
| 6,209,111 B1 | 3/2001 | Kadyk et al. |
| 6,341,341 B1 | 1/2002 | Grummon et al. |
| 6,728,922 B1 | 4/2004 | Sundaram et al. |
| 6,745,284 B1 | 6/2004 | Lee et al. |
| 6,745,305 B2 | 6/2004 | McDowell |
| 6,795,966 B1 | 9/2004 | Lim et al. |
| 6,829,617 B2 | 12/2004 | Sawdon et al. |
| 6,857,001 B2 | 2/2005 | Hitz et al. |
| 6,892,211 B2 | 5/2005 | Hitz et al. |
| 7,007,196 B2 | 2/2006 | Lee et al. |
| 7,032,154 B2 | 4/2006 | Kidorf et al. |
| 7,043,677 B1 | 5/2006 | Li |
| 7,133,964 B2 | 11/2006 | Rodrigues et al. |
| 7,162,486 B2 | 1/2007 | Patel et al. |
| 7,174,352 B2 | 2/2007 | Kleiman et al. |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (3 pages).

(Continued)

Primary Examiner — Tony Mahmoudi
Assistant Examiner — Brian E. Weinrich
(74) Attorney, Agent, or Firm — Osha Liang LLP

(57) ABSTRACT

A method for scrubbing a storage pool is disclosed. The method includes loading a scrub queue with a number of identifiers corresponding to a number of datasets, selecting a first identifier from the scrub queue, where the first identifier corresponds to a first dataset, initiating a scrubbing of the first dataset. The method further includes, upon receiving an indication of a requirement to pause the scrubbing, pausing the scrubbing of the first dataset, creating a bookmark recording a last location within the first dataset that was scrubbed before pausing the scrubbing of the first dataset, detecting at least one change to a storage pool, and performing a modification in response to detecting the at least one change to the storage pool.

17 Claims, 15 Drawing Sheets

U.S. PATENT DOCUMENTS

| | | | |
|---|---|---|---|
| 7,200,715 | B2 | 4/2007 | Kleiman et al. |
| 7,434,012 | B1* | 10/2008 | Ives et al. .................... 711/159 |
| 7,747,584 | B1* | 6/2010 | Jernigan, IV ................ 707/692 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2003/0158861 | A1* | 8/2003 | Sawdon et al. ............... 707/200 |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0028048 | A1* | 2/2005 | New et al. ........................ 714/54 |
| 2005/0097270 | A1 | 5/2005 | Kleiman et al. |
| 2005/0235154 | A1 | 10/2005 | Serret-Avila |
| 2006/0039196 | A1* | 2/2006 | Gorobets et al. ......... 365/185.01 |
| 2006/0168409 | A1 | 7/2006 | Kahn et al. |
| 2006/0218644 | A1 | 9/2006 | Niles et al. |
| 2006/0256965 | A1 | 11/2006 | Rowe |
| 2010/0262578 | A1* | 10/2010 | Arimilli et al. ............... 707/692 |

OTHER PUBLICATIONS

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrators Guide; Sun Microsystems, Inc., Feb. 2000, Revision a (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeit Jorg Schilling, eingereicht am 23.05. 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M. L.; "File System Performance and Transaction Support"; University of California at Berkeley, 1992 (131 pages).

\* cited by examiner

STORAGE POOL SCRUBBING WITH CONCURRENT SNAPSHOTS

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems.

File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file, each time the file is extended (i.e., modified via a write request to add information). Whereas extent-based allocation creates a large series of contiguous blocks (i.e., extents) each time the file exhausts the space available in the last extent of the file.

SUMMARY

In general, in one aspect, the invention relates to a computer readable storage medium having a computer readable program code embodied therein, the computer readable program code adapted to be executed by a processor to perform a method, the method comprising loading a scrub queue with a plurality of identifiers corresponding to a plurality of datasets in a storage pool, selecting a first identifier from the scrub queue, wherein the first identifier corresponds to a first dataset, wherein the first dataset is a dataset of the plurality of datasets initiating a scrubbing of the first dataset, upon receiving an indication of a requirement to pause the scrubbing: pausing the scrubbing of the first dataset, creating a bookmark recording a last location within the first dataset that was scrubbed before pausing the scrubbing of the first dataset, detecting at least one change to the storage pool, and performing a modification in response to detecting the at least one change to the storage pool.

In general, in one aspect, the invention relates to a system that includes a processor, a computer readable storage medium having computer readable program code embodied therein, the computer readable program code adapted to, when executed by the processor, implement a method, the method comprising: loading a scrub queue with a plurality of identifiers corresponding to a plurality of datasets to be scrubbed, selecting a first identifier from the scrub queue, wherein the first identifier corresponds to a first dataset, wherein the first dataset is an oldest dataset of the plurality of datasets, initiating a scrubbing of the first dataset, upon receiving an indication of a requirement to pause the scrubbing: pausing the scrubbing of the first dataset, creating a bookmark recording a last location within the first dataset that was scrubbed before pausing the scrubbing of the first dataset, detecting at least one change to a storage pool comprising the plurality of datasets, and performing a modification in response to detecting the at least one change to the storage pool.

In general, in one aspect, the invention relates to a computer readable storage medium having a computer readable program code embodied therein, the computer readable program code adapted to be executed by a processor to perform a method, the method comprising: scrubbing a first dataset, determining a birth time of the first dataset, and scrubbing a second dataset, comprising scrubbing a plurality of blocks of the second dataset, wherein each of the plurality of blocks is determined to have a birth time after the birth time of the first dataset, wherein scrubbing the second dataset is performed after scrubbing the first dataset.

Other aspects of the invention will be apparent from the following description and the appended claims.

DETAILED DESCRIPTION

Figure 1:
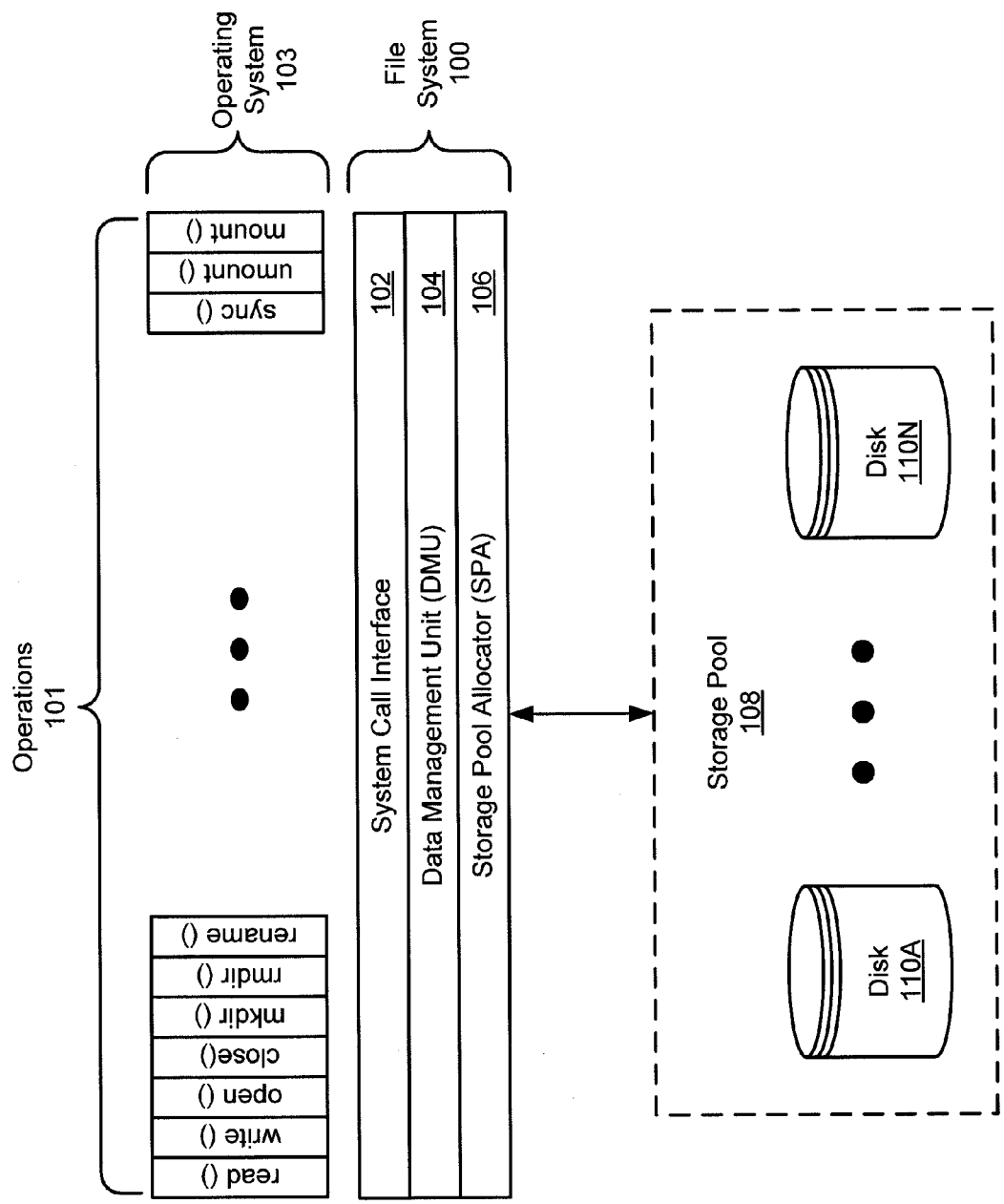
FIG. 1 shows a system architecture, in accordance with an embodiment of the invention.

Specific embodiments of the invention will now be described in detail with reference to the accompanying FIGs. Like elements in the various FIGs. are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for scrubbing datasets included in a storage pool. Each dataset may be a hierarchical block tree (HBT), a snapshot of an HBT, or a clone of an HBT. As used herein, the term "scrubbing" refers retrieving a block (data block or indirect block), calculating a checksum for the retrieved block, and then comparing the calculated checksum to a previously stored checksum. Further, if the two checksums do not match, the scrubbing may further include resilvering the block (i.e., storing a correct copy of the retrieved block in the storage pool). Further, embodiments of the invention allow for snapshots and/or clones to be created in the storage while the scrubbing is being performed (either concurrently or while the scrubbing is temporarily paused).

In one or more embodiments, each dataset may include a snapshot pointer configured to point to a next snapshot created from the dataset. In addition, each dataset may include a snapshot pointer configured to point to a previous snapshot corresponding to the previous state of the dataset. Each dataset may also include a clones pointer configured to point to any clones created from the dataset. Further, in or more embodiments, a data structure (referred to as a "scrub queue") may be configured to store identifiers of datasets of a storage pool that are required to be scrubbed.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (e.g., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3A below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (10A-110N)). Further, in one embodiment of the invention, the storage capacity of the storage pool (108) may increase and decrease dynamically as physical disks are added and/or removed from the storage pool. In one embodiment of the invention, the storage space available in the storage pool (108) is managed by the SPA (106).

Figure 2:
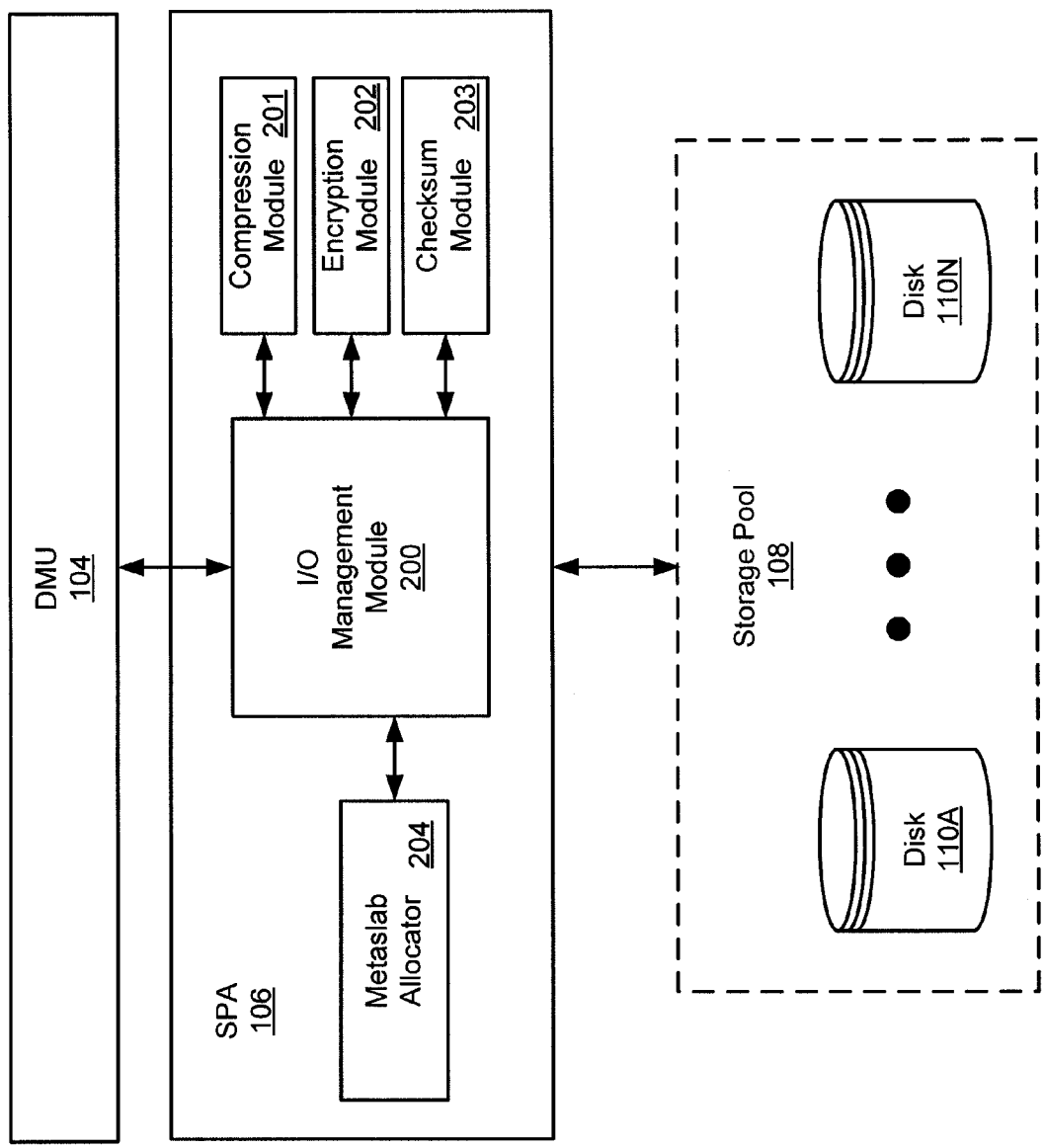
FIG. 2 shows a storage pool allocator, in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool (108) and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data (i.e., metaslabs). The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3A:
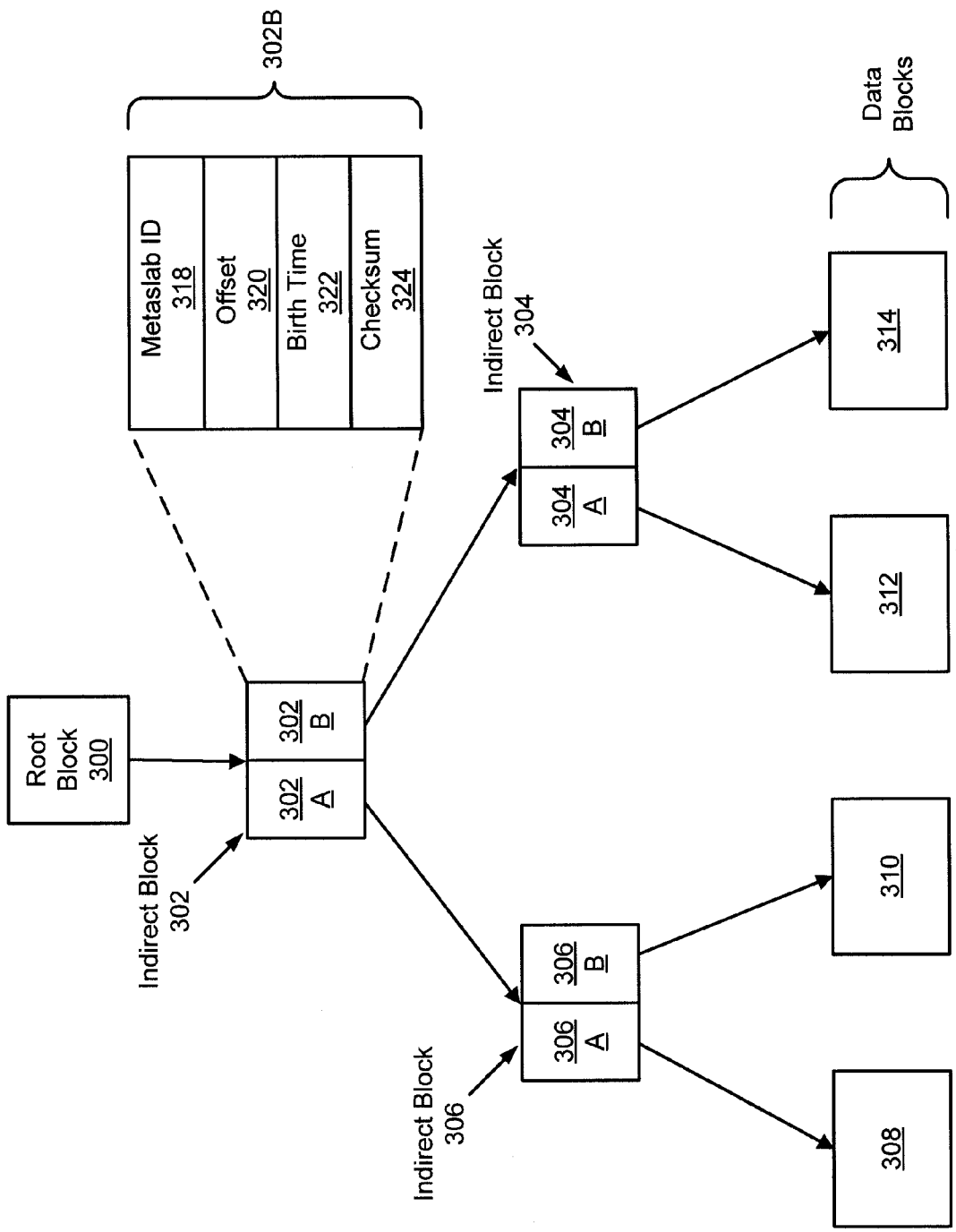
FIGS. 3A-3B show hierarchical block trees, in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3A shows a hierarchical block tree (HBT) for storing data blocks and indirect blocks within the storage pool in accordance with one embodiment of the invention. In one embodiment of the invention, the HBT includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, 306A, etc.) that, directly or indirectly, reference to data blocks (308, 310, 312, and 314). The data blocks (308, 310, 312, and 314) include actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks actual data of files within the file system.

In one embodiment of the invention, each block pointer includes a metaslab ID (318), an offset (320) within the metaslab, a birth time value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The HBT may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU (104) writes out all of the modified data blocks in the HBT to unused segments within the storage pool. Subsequently, the DMU (104) writes out the corresponding block pointers (within indirect blocks) to unused segments in the storage pool. In one embodiment of the invention, fields (i.e., metaslab ID, offset, birth time, checksum) for the corresponding block pointers are populated by the DMU (104) prior to sending an I/O request to the SPA (106). The indirect blocks including the block pointers are typically written one level at a time. To complete the copy-on-write transaction, the SPA (106) issues a single write that atomically changes (i.e., overwrites) the root block to reference the indirect blocks referencing the modified data block.

Figure 3B:
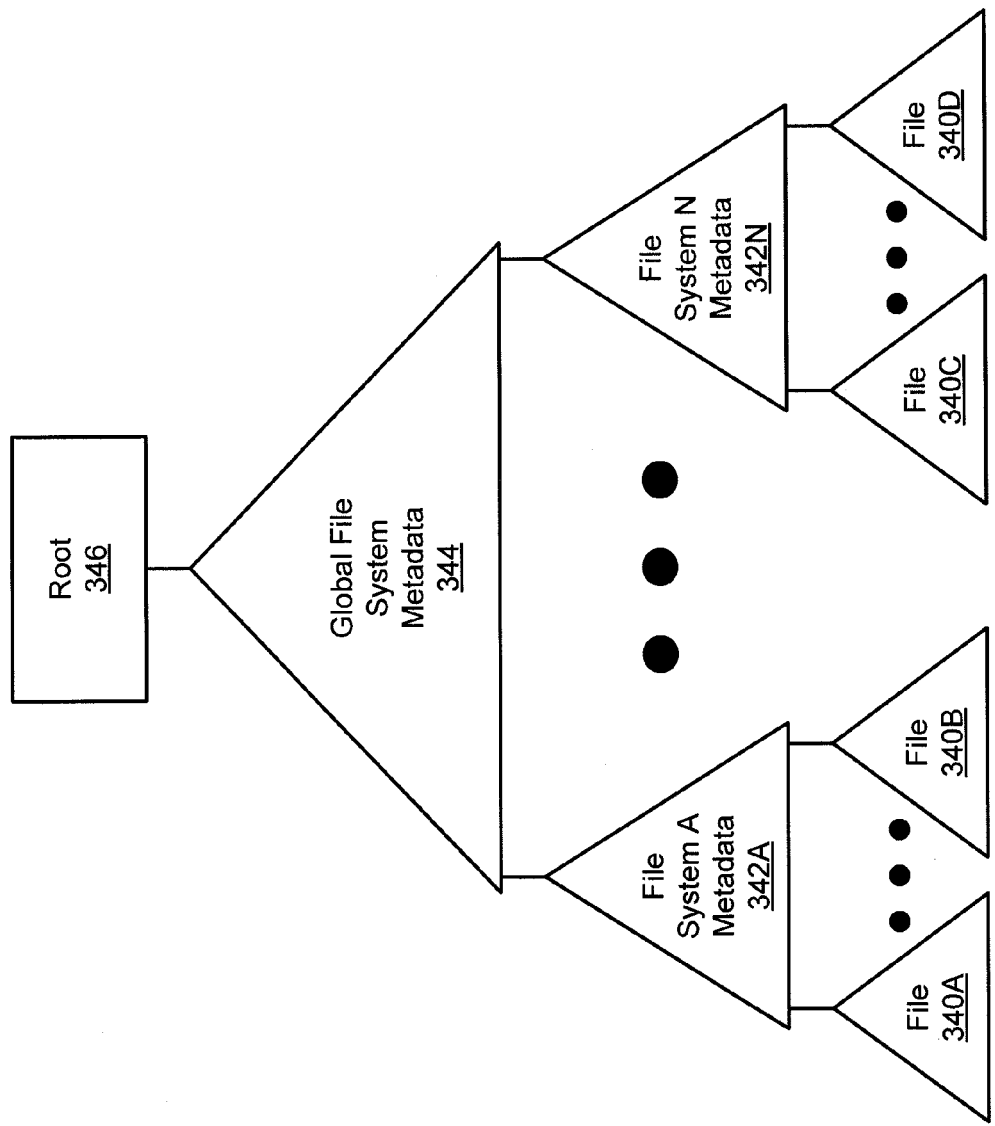

FIG. 3B shows hierarchical data configured in accordance with one embodiment of the invention. More specifically, FIG. 3B shows a hierarchical data configuration for a storage pool including both data and metadata. As shown in FIG. 3B, all the data and metadata in the storage pool are referenced (directly or indirectly) by a root (346). The root (346) directly references global file system metadata (344). In one embodiment of the invention, the global file system metadata (344) corresponds to metadata associated with the overall storage pool. In one embodiment of the invention, the global file system metadata (344) is organized in a HBT (such as the one shown in FIG. 3A) where the root (346) references the root of the global file system metadata (544), and the leaf nodes of the global file system metadata (344) correspond to root nodes (not shown) of the file systems within the storage pool defined by the file system metadata (342A, 342N).

In one embodiment of the invention, the file system (342A, 342N) corresponds to metadata associated with the individual file systems within the storage pool. In one embodiment of the invention, the file system metadata (342A, 342N) is organized in a HBT (such as the one shown in FIG. 3A) where the leaf nodes of the file system metadata (342A, 342N) correspond to root nodes (not shown) of the individual files (340A, 340B, 340C, 340D). Finally, in one embodiment of the invention, each file is organized in a HBT such as the one shown, for example, in FIG. 3A.

Using the infrastructure shown in FIGS. 1-3B, the following discussion describes the creation of a snapshot of the HBT and the creation of a clone from the snapshot. Hereinafter, an HBT, snapshot, or clone may be referred to generically as a dataset.

In one embodiment of the invention, the HBT corresponds to a group of blocks referenced, directly or indirectly, by a root block. As discussed above, as the blocks referenced by the root block are modified, the modified blocks are written to unused locations in the storage pool and the root block is modified to include references to the modified blocks.

In one embodiment of the invention, a snapshot corresponds to a state of the HBT at a given time, where the state of the HBT corresponds to all blocks referenced, directly or indirectly, by the root block of the HBT at the aforementioned time. In one embodiment of the invention, a clone corresponds to an HBT where the initial state of the clone is obtained from a snapshot of the HBT. Said another way, the clone corresponds to a pre-populated HBT where the clone initially includes only blocks referenced, directly or indirectly, by the root block of the HBT at the time the snapshot was created. In one embodiment of the invention, the file system may also create snapshot(s) of the clones.

Figure 4:
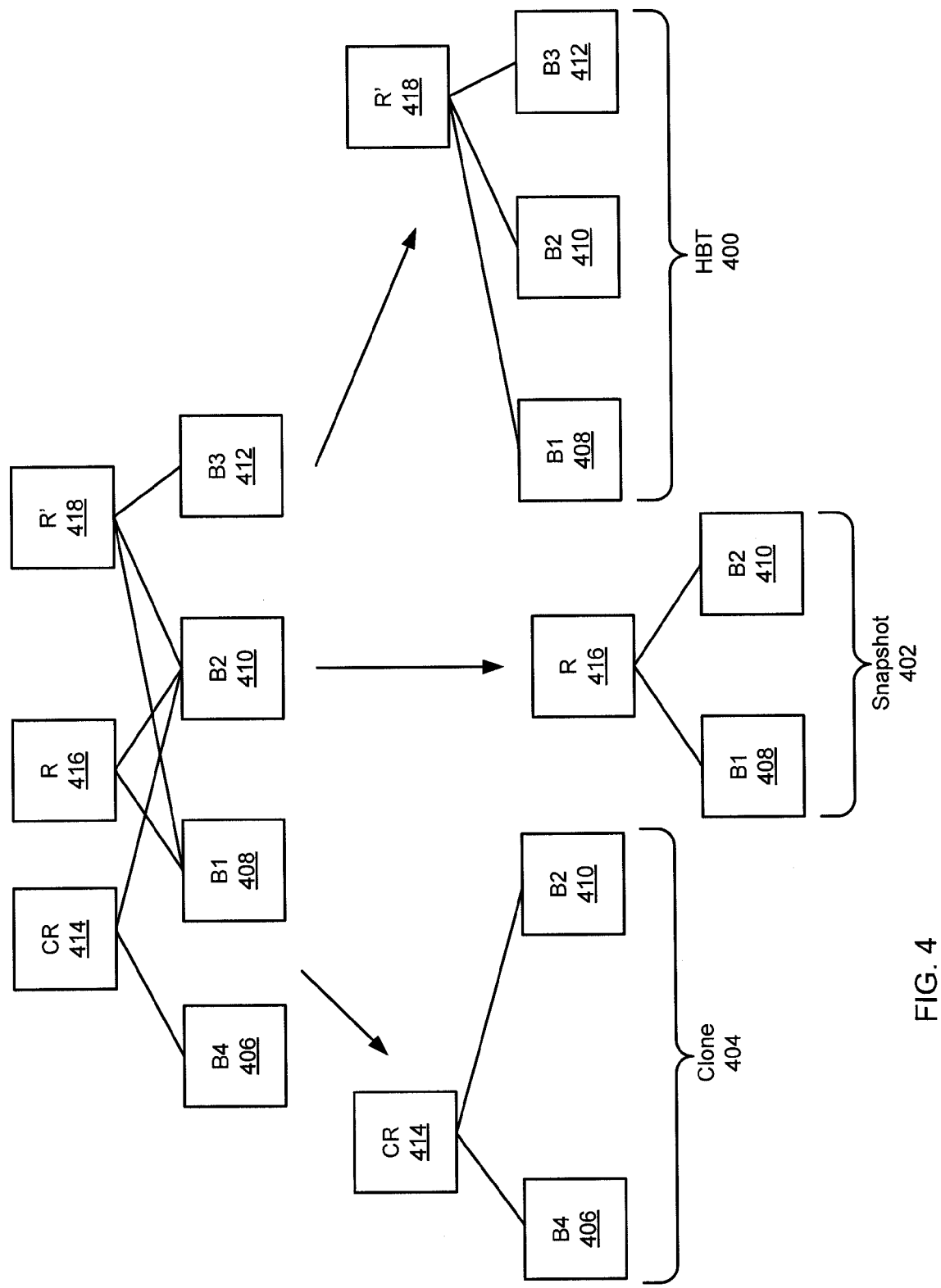
FIG. 4 shows a hierarchical block tree, a snapshot, and a clone, in accordance with an embodiment of the invention.

In one embodiment of the invention, the HBT and the clone may each be modified independently. For example, modifying the contents of the HBT does not affect the clone and vice-versa. Further, the file system is configured to manage HBTs, snapshots and clones concurrently. For example, FIG. 4 shows a HBT, a snapshot, and a clone in accordance with an embodiment of the invention. As shown in FIG. 4, each block (e.g., B1 (408), B2 (410), B3 (412), B4 (406)) may be referenced by, and therefore be a part of, the HBT (400), the snapshot (402), and the clone (404).

Specifically, the HBT (400) includes a second version of the root block R' (418). The second version of the root block R' (418) in turn references blocks B1 (408), B2 (410), and B3 (412). Further, the snapshot (402) includes a first version of the root block R (416). The first version of the root block R (416) in turn references blocks B1 (408) and B2 (410). Finally, the clone (404) includes a copy of the first version of the root block CR (i.e., the clone root block) (414). The clone root block CR (414) in turn references blocks B2 (408) and B4 (406).

As discussed above, the snapshot of the HBT correspond to the state of the HBT at a given time. Accordingly, in FIG. 4, the snapshot (402) corresponds to the state of the HBT (400) prior to the addition of block B3 (412) to the HBT (400). Similarly, as discussed above, the initial state of the clone corresponds to the snapshot. Accordingly, in FIG. 4, the initial state of the clone (404) (i.e., the blocks initially referenced by the clone root block CR (414)) includes blocks B1 (406) and B2 (408).

Finally, as discussed above, the clone and the HBT may be modified independently of one another. As shown in FIG. 4, the clone (404) is modified to remove the reference to block B1 (408) and to add a reference to block B4 (406). The removal of the reference to block B1 (408) from the clone (404) did not affect the reference to block B1 (408) by the HBT (400).

Figure 5A:
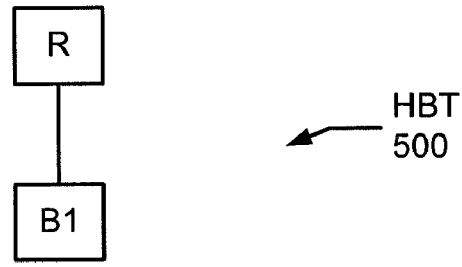
FIGS. 5A-5F show examples to illustrate one or more embodiments of the invention.
Figure 5B:
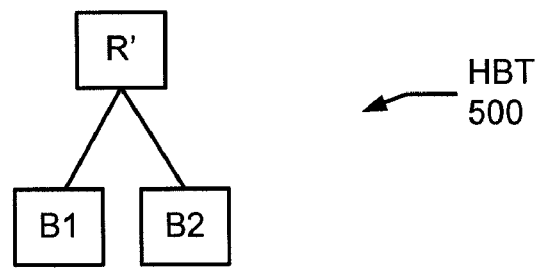

FIG. 5A-5F show examples to illustrate one or more embodiments of the invention. More specifically, FIGS. 5A-5F show an example of the creation of an HBT, a snapshot, and a clone in accordance with one embodiment of the invention. Referring to FIG. 5A, the HBT (500) initially includes a root block (R) and block (B1), where R references B1. Referring to FIG. 5B, HBT (500) is subsequently modified to include a reference to block (B2). In accordance with the copy-on-write mechanism implemented by the file system, R (in FIG. 5A) is overwritten with a modified copy of the root block (R'), where the R' references both B1 and B2.

Figure 5C:
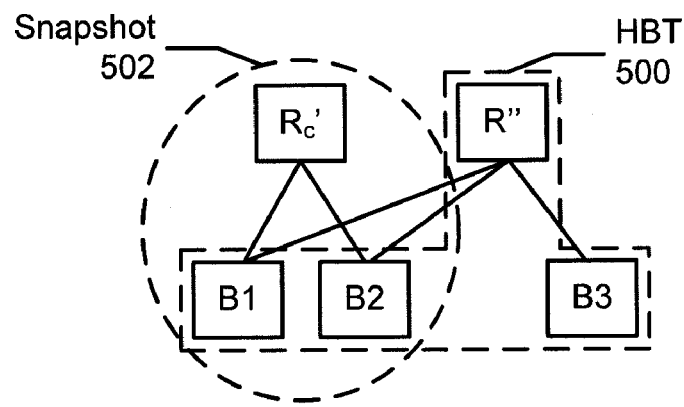

Referring to FIG. 5C, at some later point in time a snapshot (502) of HBT (500) is created. The snapshot (502) is created prior to modifying R' to obtain R", where R" is a modified version of R' and references B1, B2 and block (B3). As shown in FIG. 5C, the snapshot (502) includes a copy of R' (denoted as $R_C'$). $R_C'$ references B1 and B2. Note that the snapshot (502) does not include an additional copy of B1 and B2.

Figure 5D:
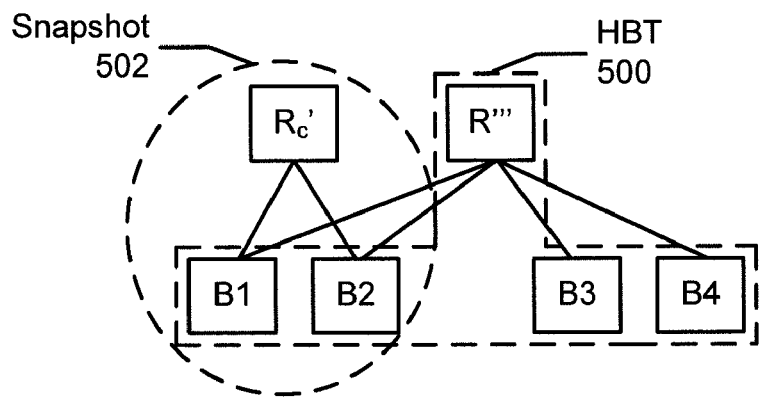

Referring to FIG. 5D, HBT (500) is subsequently modified to include a reference to block (B4). In accordance with the copy-on-write mechanism implemented by the file system, R" (in FIG. 5C) is overwritten with a modified copy of the root block (R'"), where the R'" references B1, B2, B3 and B4.

Figure 5E:
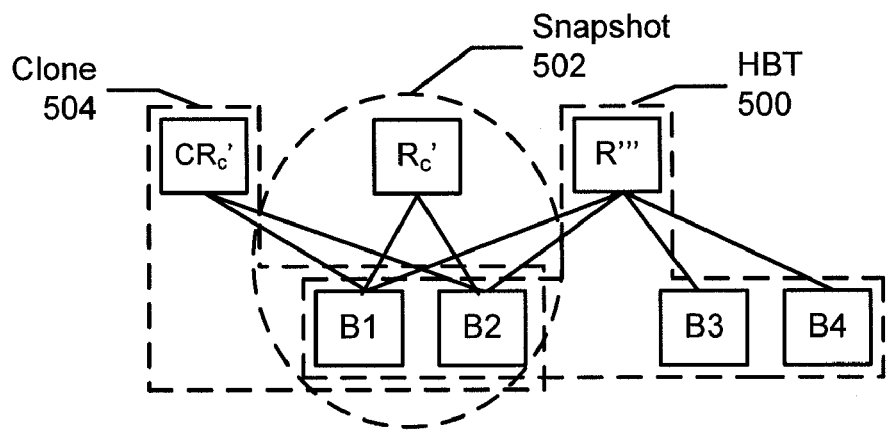

Referring to FIG. 5E, at some later point in time, a clone (504) is created from the snapshot (502). As shown in FIG. 5E, the clone (504) includes a copy of R' (denoted as $CR_C'$). $CR_C'$ references B1 and B2. Note that the clone (504) does not include an additional copy of B1 and B2.

Figure 5F:
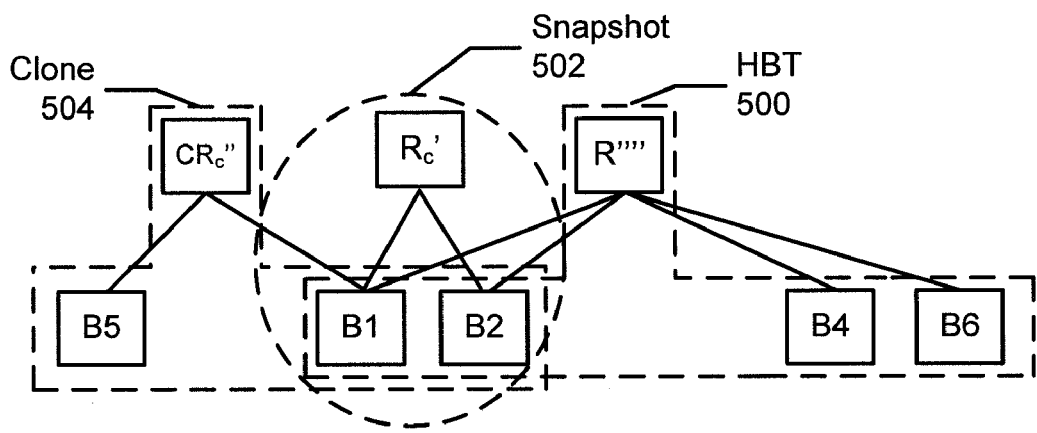

Finally, referring to FIG. 5F, HBT (500) is subsequently modified to delete a reference to B3 and to include a reference to block (B6). In accordance with the copy-on-write mechanism implemented by the file system, R'" (in FIG. 5D) is overwritten with a modified copy of the root block (R""), where the R"" references B1, B2, B4 and B6. In addition, the clone (504) is modified to delete a reference to B2 and to include a reference to block (B5). In accordance with the copy-on-write mechanism implemented by the file system, $CR_c'$ (in FIG. 5E) is overwritten with a modified copy of the root block ($CR_x''$), where the $CR_c''$ references both B1 and B5.

Figure 6:
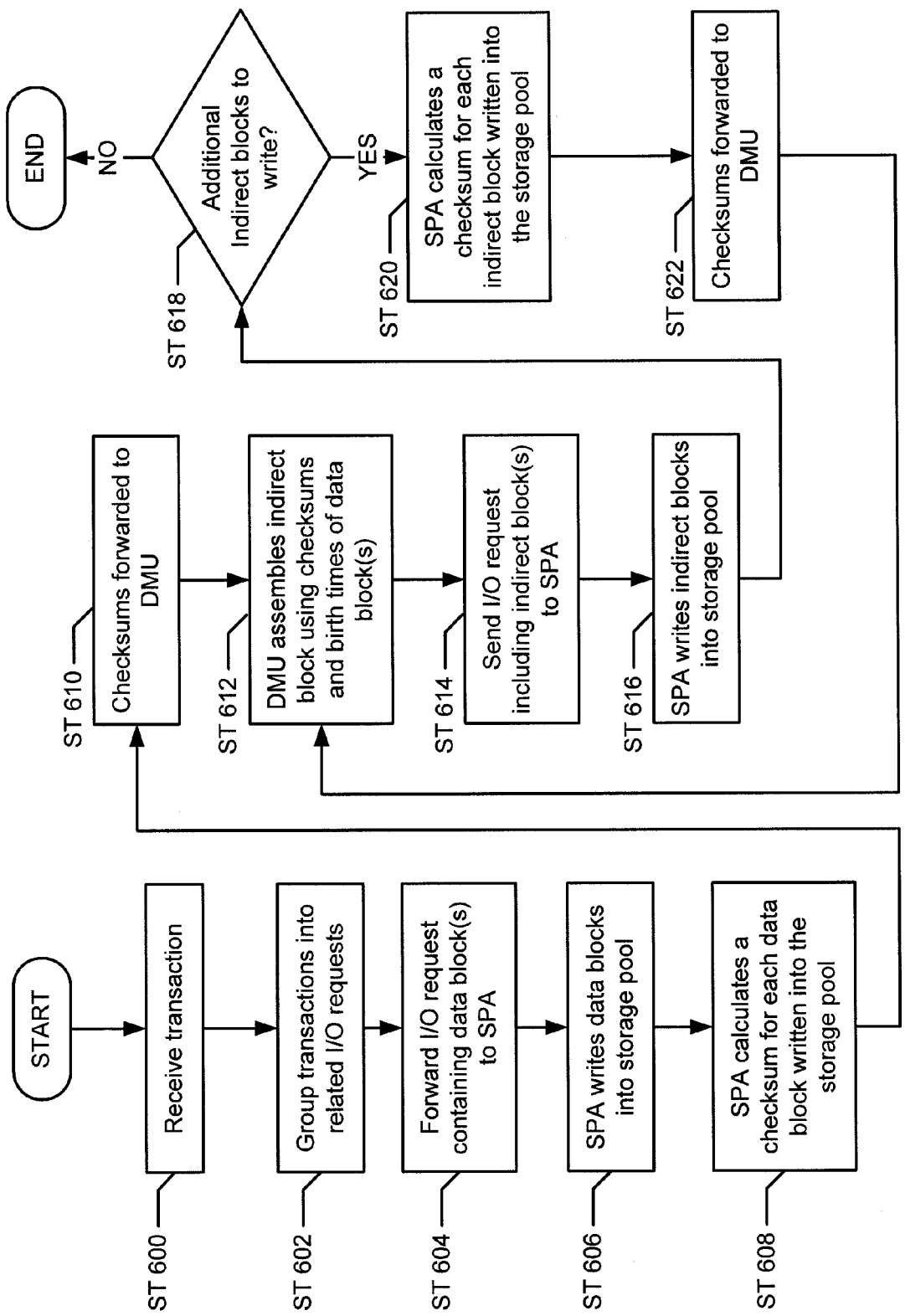
FIG. 6 shows a flow chart for writing blocks of a dataset, in accordance with an embodiment of the invention.

FIG. 6 shows a flow chart for writing blocks of a dataset, in accordance with one embodiment of the invention. Initially, a DMU (e.g., DMU (104) shown in FIG. 1) receives a transaction from an application, the operating system (or a subsystem therein), etc. (ST 600). The DMU subsequently groups the transaction into one or more I/O requests (ST 602). The I/O requests are subsequently forwarded to the SPA (ST 604).

In one embodiment of the invention, the transaction includes one or more data blocks, and/or one or more indirect blocks. As discussed above with reference to FIG. 3A, a dataset (i.e., an HBT, a snapshot, or a clone) may be stored on a disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, the I/O request referenced at ST 604 includes data blocks.

Continuing with FIG. 6, an SPA (e.g., SPA (106) shown in FIGS. 1-2), upon receiving the I/O request including data blocks from the DMU, writes the data blocks into the storage pool (ST 606). The SPA subsequently calculates a checksum for each data block written into the storage pool (ST 608). In one embodiment, a checksum module (e.g., checksum module (203) shown in FIG. 2) within the SPA may be used to calculate the checksum for each data block written into the storage pool. The checksums are subsequently forwarded to the DMU (ST 610). The DMU then assembles the indirect blocks using the checksums and birth times of the data blocks (ST 612). Specifically, the DMU places the checksum and birth time for a given data block in the appropriate block pointer within the indirect block (i.e., the parent indirect block of the data block). Next, the indirect blocks are forwarded to the SPA (ST 614). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 616). A determination is then made whether additional indirect blocks exist to write into the storage pool (i.e., whether the last indirect block written to the storage pool corresponds to the root block) (ST 618). If no additional indirect blocks exist, then the method is complete. However, if it is determined at ST 618 that additional indirect blocks exist, then the SPA calculates the checksum from each of the indirect blocks written into the storage pool (ST 620). The checksums for each of the indirect blocks is subsequently forwarded to the DMU (ST 622). Steps ST 612 through ST 622 are subsequently repeated until the root block is written into the storage pool.

In one embodiment of the invention, the method shown in FIG. 6 may also be used to write indirect blocks for the file system metadata and global file system metadata described in FIG. 3B.

Figure 7A:
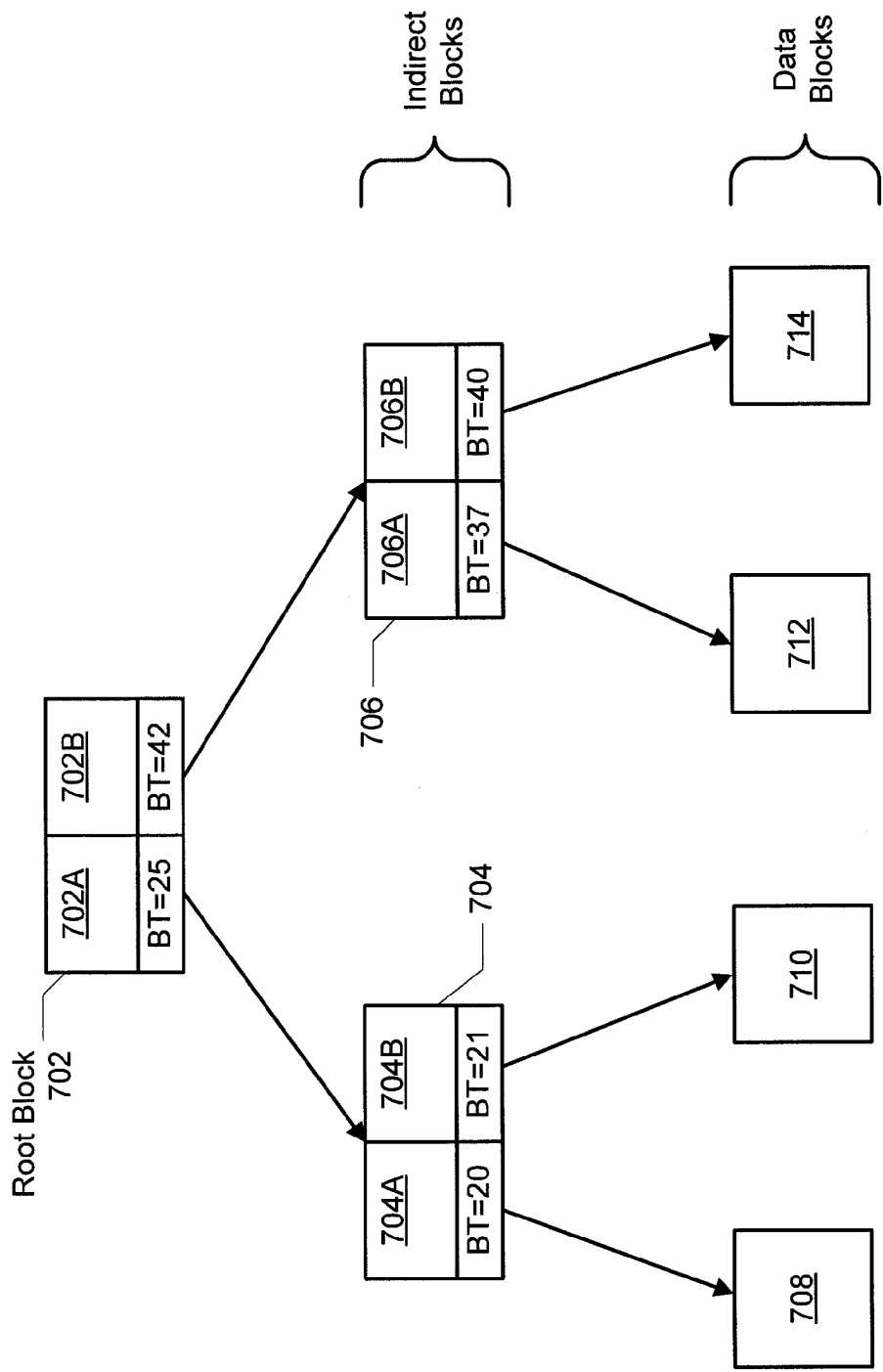
FIGS. 7A-7B show an example of writing blocks of datasets, in accordance with an embodiment of the invention.
Figure 7B:
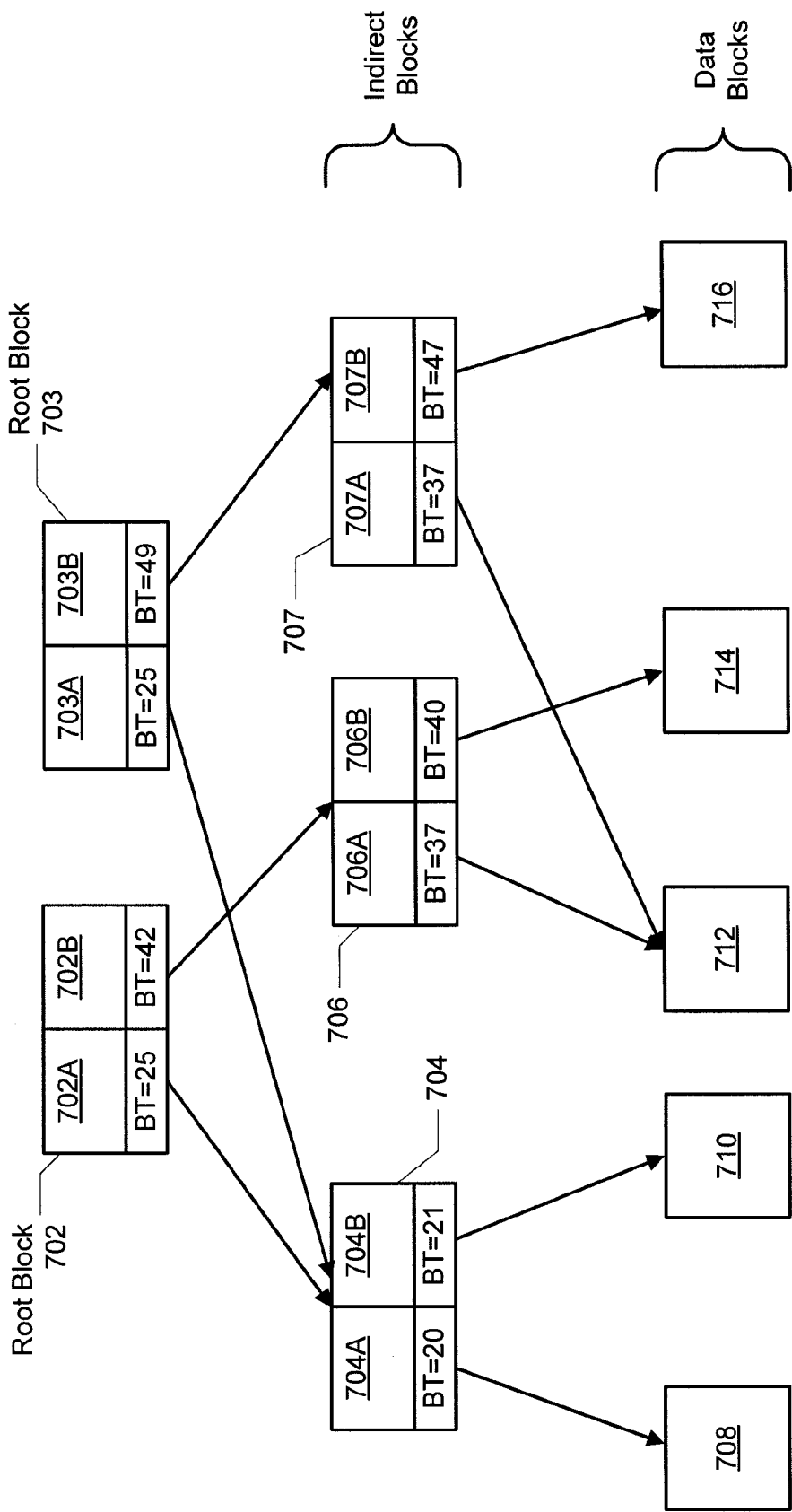

FIGS. 7A-7B show an example of writing blocks of datasets, in accordance with one embodiment of the invention. More specifically, FIGS. 7A-7B show an example of writing the blocks of datasets by applying the method described above with reference to FIG. 6.

As shown in FIG. 7A, an exemplary dataset may include four data blocks (i.e., 708, 710, 712, and 714). Each data block within the dataset has a corresponding birth time (i.e., BT=20, 21, 37, 40, respectively) stored in a corresponding block pointer (i.e., 704A, 704B, 706A, 706B, respectively). Each of the block pointers is stored in an indirect block (i.e., 704, 706). Further, each indirect block also has a corresponding birth time stored in a corresponding block pointer in a root block (702). Specifically, block pointer (702A) includes the birth time BT=25 for indirect block (704), and block pointer (702B) includes the birth time BT=42 for indirect block (706).

In one or more embodiments, the birth times of the blocks at a given level of the dataset are always earlier than the birth times of the corresponding indirect blocks at the next level higher on the hierarchy. For example, the birth time of indirect block (704) is BT=25, which is after the birth times (i.e., BT=20, 21, respectively) of the data blocks (i.e., 708, 710) referenced by indirect block (704). Accordingly, because the root block (702) is created with reference to the indirect blocks (i.e., 704, 706), the birth time of the root block (702) can be assumed to be later than the latest birth time of the referenced indirect blocks (i.e., BT=42 for indirect block (706)). For the purpose of this example, assume that the birth time of root block (702) is BT=45.

FIG. 7B shows a situation in which a snapshot of the dataset shown in FIG. 7A has been created, and in which the dataset has been subsequently modified. Specifically, root block (702) is the root of the snapshot, and root block (703) is the root of the modified dataset. As shown, the modified dataset includes has replaced indirect block (706) with indirect block (707). In particular, indirect block (707) differs from indirect block (706) by referencing data block (716) instead of data block (714). Note that, as shown in block pointer (707B), the data block (716) has a birth time of BT=47. Further, as shown in block pointer (703B), the indirect block (707) has a birth time of BT=49. Accordingly, the root block (703) can be assumed to have a birth time after BT=49. For the purpose of this example, assume that the birth time of root block (703) is BT=50.

In one or more embodiments, the scrubbing of data blocks of a dataset may be performed in a hierarchical manner. Specifically, the scrubbing may be initiated at a root block of the dataset, and may traverse down through the hierarchical tree of the HBT. For example, referring to FIG. 7B, a scrubbing of the snapshot may begin at root block (702), and may continue to indirect block (704), data block (708), data block (710), indirect block (706), data block (712), and data block (714).

After completing scrubbing the snapshot, the scrubbing of the modified dataset may be initiated at the root node (703). In one or more embodiments, the birth times included in the block pointers of root block (703) may be analyzed to determine if the blocks referenced by root block (703) have already been scrubbed as part of another dataset. In particular, if the birth time of a referenced block is older that the birth time of a previously scrubbed dataset (i.e., the birth time of the root block of the previous dataset), the referenced block may be assumed to have already been scrubbed as part of an earlier-scrubbed dataset and, there it is not scrubbed). For example, as described above, the indirect block (704) was already scrubbed as part of the snapshot (with root block (702)). Thus, in one or more embodiments, indirect block (704) may be skipped during the scrubbing of the modified dataset (with root block (703)). Further, any blocks below the indirect block (704) (which are necessarily older than (or at least the same age as) the indirect block) (i.e., data blocks 708, 710) may also be skipped, because they were also scrubbed as part of the snapshot. This method of skipping already-scrubbed blocks is described further below with reference to FIG. 8B.

Figure 8A:
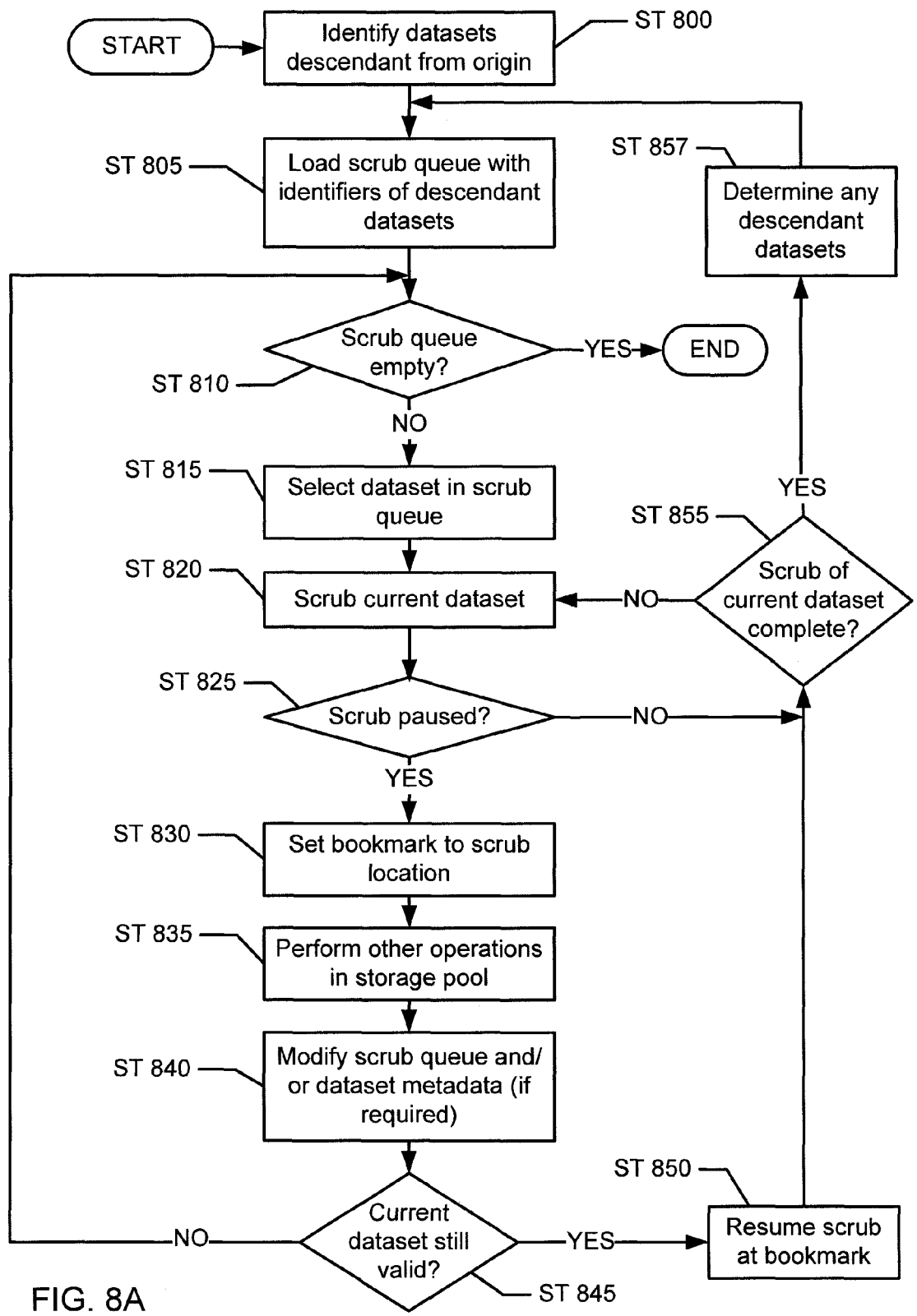
FIGS. 8A-8B show flow charts, in accordance with an embodiment of the invention.

FIG. 8A shows a flow chart for scrubbing datasets of a storage pool, in accordance with an embodiment of the invention. At ST 800, any datasets descendant from an origin dataset (i.e., an initial blank dataset of the storage pool) may be identified. In one embodiment of the invention, all file systems (excluding clones and snapshots) are initially designated as clones of the origin dataset. At ST 805, identifiers corresponding to the descendant datasets may be loaded into a scrub queue. In one or more embodiments, the descendent datasets may be identified using the snapshot pointer and/or clones pointer associated with the origin dataset. In one or more embodiments, the identifiers in the scrub queue may be ordered according to the birth times (based on the root blocks) of the corresponding datasets (e.g., from earliest dataset to latest dataset).

At ST 810, a determination is made about whether the scrub queue is empty (i.e., all datasets have been scrubbed). If it is determined that the scrub queue is not empty, then at ST 815, the dataset in the scrub queue may be selected. In one embodiment of the invention, the data set is selected pseudo-randomly. In another embodiment of the invention, the oldest dataset in the scrub queue is selected. At ST 820, the current dataset (selected at ST 815) may be scrubbed. ST 820 is described in greater detail below with reference to FIG. 8B.

At ST 825, a determination is made about whether the scrubbing of the current dataset is paused. For example, the scrubbing may be paused according to a predefined pause period, a user command or request, a program instruction, an interrupt, or any other operation that may result in the dataset being paused. If it is determined that the scrubbing is not paused, then at ST 855, a determination is made about whether the scrubbing of the current dataset is complete. If it is determined at ST 855 that the scrubbing of the current dataset is not complete, then the scrubbing of the current dataset is continued at ST 820. However, if it determined at ST 855 that the scrubbing of the current dataset is complete, then at ST 857, any datasets that descend from the current dataset may be identified. In one or more embodiments, such descendant datasets may be identified by a snapshot pointer and a clones pointer associated with the current dataset from which scrubbing is complete. As described above, a snapshot pointer may be configured to point to a next snapshot created from the dataset having the snapshot pointer, and a clones pointer may be configured to point to any clones created (directly or indirectly) from the dataset having the clones pointer. At ST 805, identifiers corresponding to the descendant datasets (identified at ST 857) may be loaded in the scrub queue.

Returning to ST 825, if it is determined that the scrubbing of the current dataset is paused, then at ST 830, a bookmark may be set to mark the location within the current dataset at which the scrubbing was paused. In one embodiment of the invention, the bookmark includes the following information: a dataset identifier, an object identifier (i.e., an identifier of the file currently being scrubbed), level identifier (i.e., the level in the HBT corresponding to the file being scrubbed), and a block ID, which identifies the particular block being scrubbed/to be scrubbed next when the scrubbing is paused.

At ST 835, other operations may be performed within the storage pool. For example, such operations may include creating or destroying snapshots, creating or destroying clones, freeing data blocks, and the like. In one or more embodiments, such operations may only be performed during a pause in scrubbing, thereby reducing the likelihood of causing problems in the scrubbing (e.g., not scrubbing parts of the dataset, redundant scrubbing, causing a scrubbing to restart, etc.). At ST 840, the scrub queue and/or dataset metadata may be modified as required. More specifically, in some situations, the operations performed within the storage pool (i.e., ST 835) may adversely affect the scrubbing of the current dataset or any datasets remaining to be scrubbed. In such situations, the scrub queue and/or metadata associated with any affected dataset may be modified such that the scrubbing is performed properly.

The following are modifications which may be performed at ST 840, according to one embodiment. In the event that an identifier included in the scrub queue corresponds to a dataset from which a snapshot has been created (i.e., by an operation performed at ST 835), the identifier of the dataset may be replaced within the scrub queue by the identifier of the snapshot. Further, if the dataset was in the process of being scrubbed prior to the pause, then the scrubbing may be performed on the snapshot instead of the dataset. More specifically, after the pause is complete, the scrubbing may be continued according to the bookmark, but in the snapshot rather than the dataset.

Additionally, in the event that an identifier included in the scrub queue corresponds to a dataset that is deleted by an operation performed at ST 835, the identifier of the deleted dataset may be replaced within the scrub queue by an identifier corresponding to a descendant dataset of the now deleted dataset. In one embodiment, the descendant dataset may be determined by a snapshot pointer of the deleted dataset and/or the clones pointer of the deleted dataset. Further, if the deleted dataset was in the process of being scrubbed prior to the pause, then the bookmark may be reset to the next dataset to be scrubbed.

Another operation performed at ST 835 which may affect a scrubbing operation is a clone swap. As used herein, the term "clone swap" refers to creating a temporary clone of a most recent snapshot, and receiving new data into the temporary clone. This technique allows a current HBT to remain accessible during the receipt of new data. Once the new data is fully received, the temporary clone and the HBT may be swapped, such that the new data is made available. In the event that an identifier included in the scrub queue corresponds to a first dataset that is part of a clone swap with a second dataset, the contents and the identifier of the first dataset may be swapped with the contents and the identifier of the second dataset.

At ST 845, a determination is made about whether the current dataset is still valid. For example, in the event that the operations performed within the storage pool (i.e., ST 835) have deleted or modified the current dataset, then at ST 845, it may determined that the current dataset is no longer valid. If it is determined that the current dataset is still valid, then at ST 850, the scrubbing of the current dataset may resume (i.e., after the pause is complete) at the bookmark location. At ST 855, a determination is made about whether the scrubbing of the current dataset is complete. If it is determined that the scrubbing is not complete, then the scrubbing of the current dataset is continued at ST 820. However, if it is determined at ST 845 that the current dataset is no longer valid, then returning to ST 810, it is determined whether any other datasets remain in the scrub queue. If no datasets remain in the scrub queue, the process ends (i.e., all datasets in the storage pool have been scrubbed). Otherwise, at ST 815, another dataset is selected. In other words, if the current dataset is no longer valid, the scrubbing of that dataset is abandoned, and another dataset may be selected from the scrub queue.

Figure 8B:
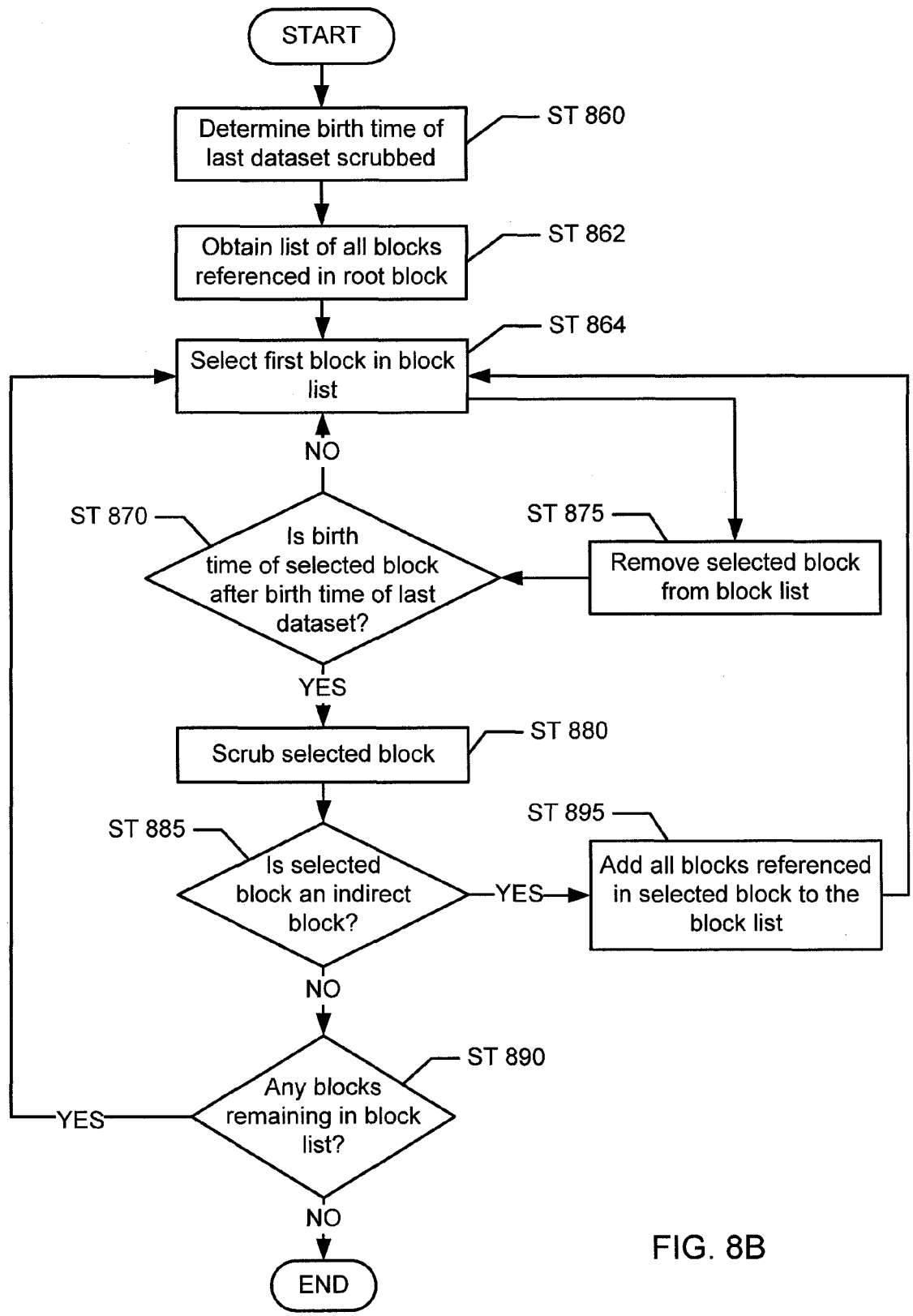

FIG. 8B shows a flow chart for performing a block-based scrubbing of a dataset, in accordance with one embodiment of the invention. In particular, FIG. 8B illustrates an exemplary expansion of the steps involved in performing ST 820 (shown in FIG. 8A) after at least one earlier dataset has already been scrubbed within the scrubbing of the storage pool. In other words, assume the current dataset is not the first dataset to be scrubbed in a current cycle of scrubbing.

In general, the flow chart shown in FIG. 8B provides a method for traversing an HBT of a dataset such that only the branches that include (or could possibly include) a block that includes a birth time after the birth time of a previously scrubbed dataset. At ST 860, a birth time of the last dataset scrubbed during the current cycle of scrubbing is determined. In one embodiment of the invention, the birth time of the last dataset scrubbed is the birth time of the root block of the last dataset scrubbed). At ST 862, a list of all blocks (typically indirect blocks) referenced directly by the root block of the current dataset is obtained. For example, referring to FIG. 7A, a list of the indirect blocks directly referenced by the root block (702) (i.e., indirect blocks (704) and (706)) may be obtained. In one or more embodiments, a block list (i.e., the list of blocks obtained at ST 862) may be a data structure storing identifiers for blocks that are candidates to be scrubbed. Optionally, the block list may be ordered from higher to lower levels of the HBT.

At ST 864, the first block in the block list may be selected for processing. At ST 875, the selected block is removed from the block list. At ST 870, a determination may be made about whether the birth time of the selected block is after the birth time of the last dataset scrubbed (determined at ST 860). If it is determined at ST 870 that the birth time of the selected block is not after the birth time of the last dataset scrubbed, then the selected block may be skipped from scrubbing. That is, as described above, a selected block having a birth time before that of the last dataset scrubbed is known to have been scrubbed as part of a different dataset, and thus there is no need to scrub the selected block and any dependent blocks (i.e., blocks depending from the identified block). Accordingly, the process proceeds to ST 864.

Referring again to ST 870, if it is determined that the birth time of the selected block is after the birth time of the last dataset scrubbed, then at ST 880, the selected block may be scrubbed. At ST 885, a determination may be made about whether the selected block is an indirect block. If so, then at ST 870, all blocks referenced by the selected block may be added to the block list. Optionally, the blocks referenced by the selected block may be added to the beginning of the block list, thereby continuing the traversal of the portion of the dataset HBT associated with the selected block. After ST 895, the process returns to ST 864 (described above).

Referring again to ST 885, if it is determined that the selected block is not an indirect block, then at ST 890, a determination may be made about whether any blocks remain on the block list. If it is determined that blocks remain on the block list, then the process returns to ST 864 (described above). However, if it is determined at ST 890 that no blocks remain on the block list, then the process ends.

Those skilled in the art will appreciate that the entire process shown in FIG. 8B is repeated for each dataset in the storage pool. That is, the hierarchical block tree representing each dataset in the storage pool is traversed in the manner described above to scrub each block only once, thereby reducing unnecessary scrubbing.

Figure 9A:
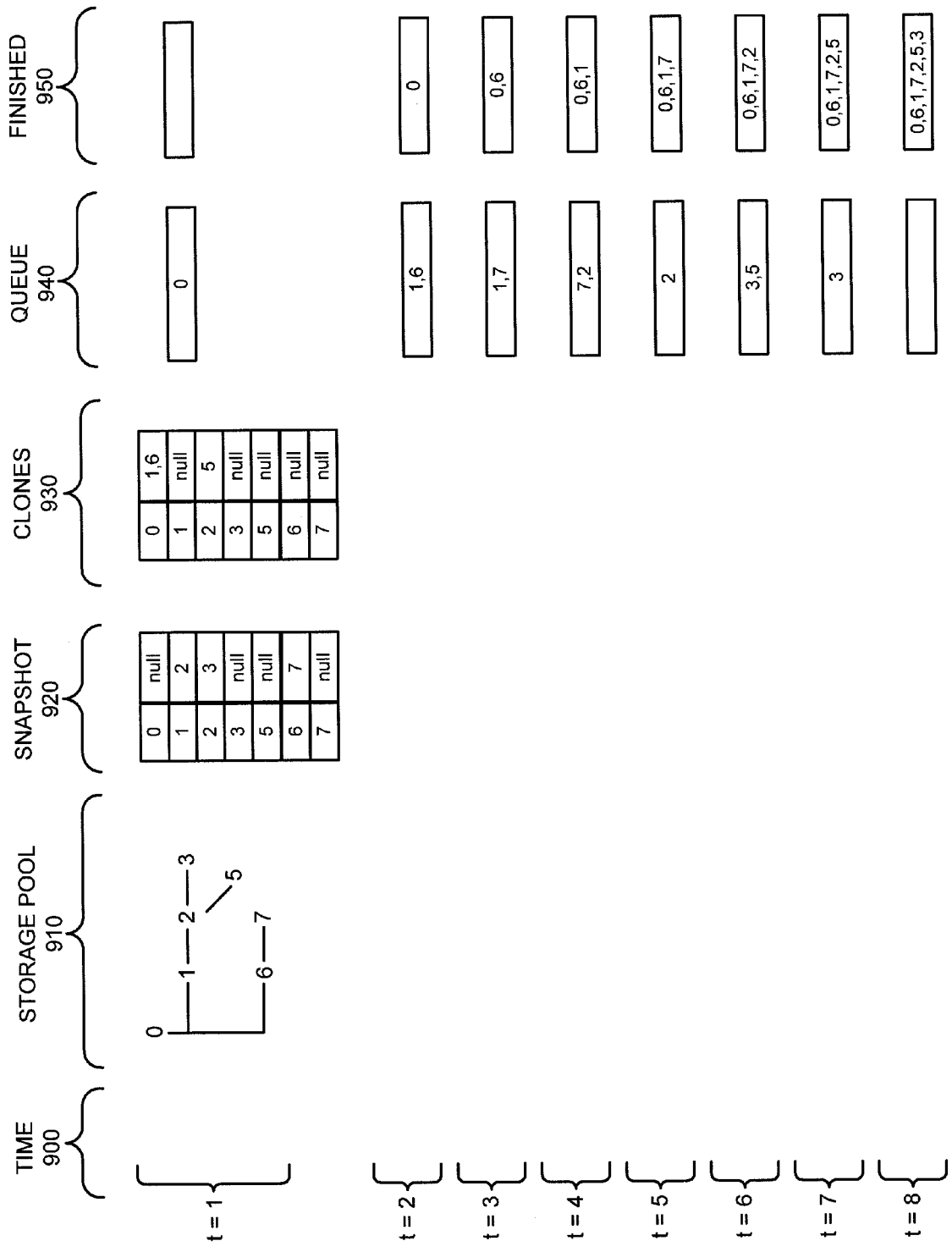
FIGS. 9A-B shows an example of scrubbing datasets of a storage pool, in accordance with an embodiment of the invention.
Figure 9B:
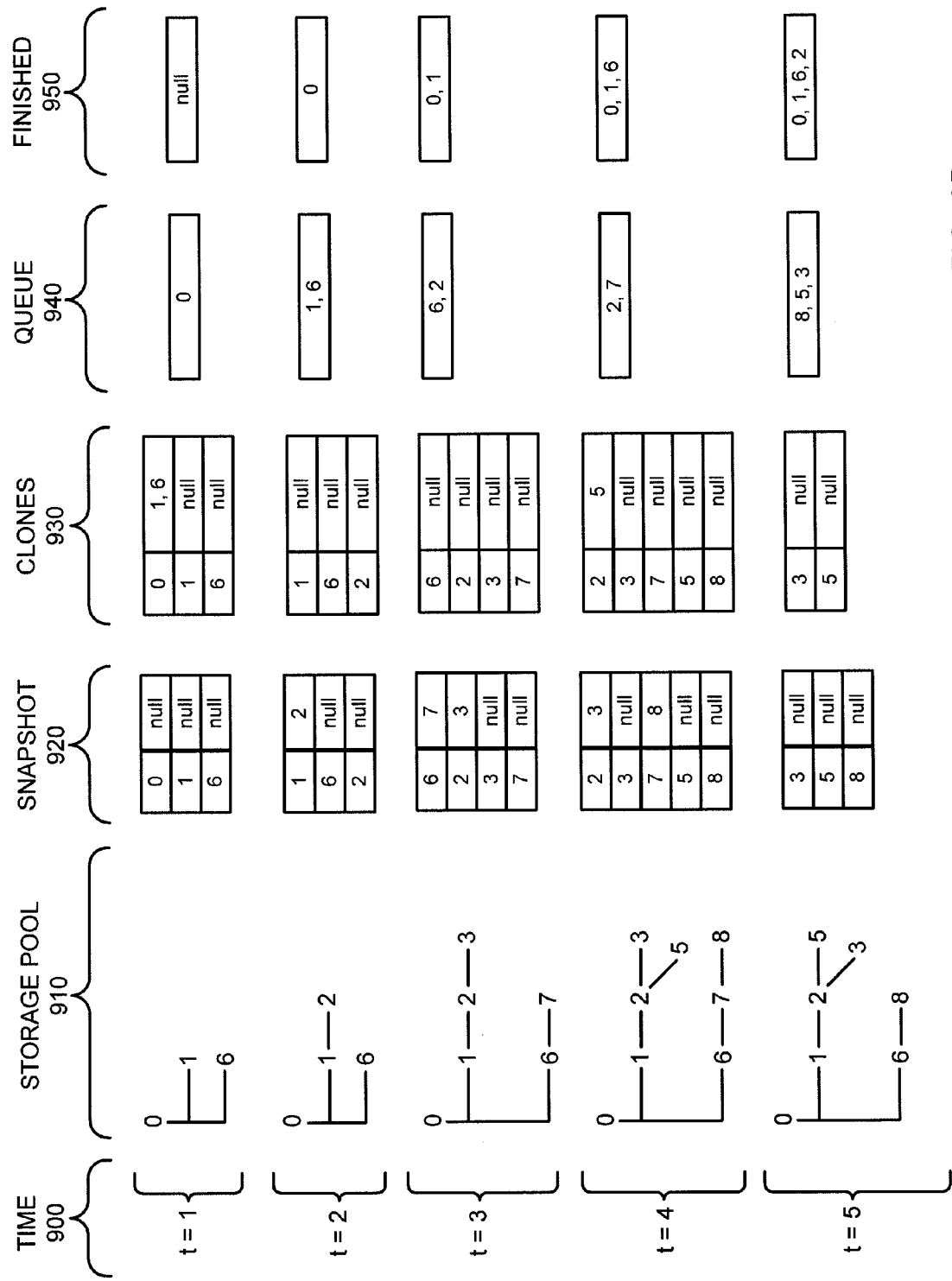

FIGS. 9A-B show examples of scrubbing datasets of a storage pool, in accordance with an embodiment of the invention. The example is not intended to limit the scope of the invention. Specifically, FIGS. 9A-B show diagrams of a storage pool (910), snapshot pointers (920), clones pointers (930), a scrub queue (940), and a finished list (950). Further, FIGS. 9A-B show the states of the aforementioned diagrams (i.e., (910)-(950)) after multiple time periods (i.e., t=1, 2, 3, etc.). Further, FIG. 9A shows an example of scrubbing datasets in a storage pool when there are no changes to the state of the storage pool (i.e., there are no additional snapshots, clones, or removal of snapshots, clones, etc.) during the scrubbing.

Referring to FIG. 9A, the state of the storage pool is shown at time period t=1 and remain the same through the duration of the scrubbing of the storage pool (as such it is not duplicated at each time period). Further, the snapshot pointers (920) and the clones pointers (930) are shown for time period t=1 and remain the same through the duration of the scrubbing of the storage pool (as such they are not duplicated at each time period)

At time period t=1, the queue (940) includes the origin dataset and none of the datasets have been scrubbed. At time period t=2, the scrubbing of the origin dataset is complete and the queue (940) includes datasets 1 and 6 (as determined by the clones pointers (930) for the origin dataset). At time period t=3, the scrubbing of dataset 6 is complete and the queue (940) includes datasets 1 and 7 (as determined by the snapshot pointers (930) for dataset 6). At time period t=4, the scrubbing of dataset 1 is complete and the queue (940) includes datasets 7 and 2 (as determined by the snapshot pointers (930) for dataset 1).

At time period t=5, the scrubbing of dataset 7 is complete and the queue (940) includes dataset 2. At time period t=6, the scrubbing of dataset 2 is complete and the queue (940) includes datasets 3 and 5 (as determined by the snapshot pointers (930) and clones pointers for dataset 2). At time period t=7, the scrubbing of dataset 5 is complete and the queue (940) includes dataset 3. At time period t=8, the scrubbing of dataset 3 is complete and the queue (940) is empty. Accordingly, the scrubbing of the dataset is complete.

Turning to FIG. 9B, FIG. 9B shows an example of scrubbing datasets in a storage pool when there are changes to the state of the storage pool during the scrubbing. Referring to FIG. 9B, as shown, after time period t=1, the storage pool (910) includes three datasets, namely an origin (i.e., 0) and two HBTs (i.e., 1, 6). In this example, datasets 1 and 6 are HBTs containing active data, and may be clones of the origin dataset 0 (i.e., an initial blank dataset of the storage pool). Accordingly, after time period t=1, the clones pointer (930) of dataset 0 includes the values "1, 6," and the clones pointers (930) of datasets 1 and 6 are null. Further, at t=1, no snapshots have been created. Accordingly, the snapshot pointers (920) of each dataset is null, meaning no next snapshot has been taken (i.e., created) from any dataset. As used herein, datasets that are created by a snapshot or a clone of an existing dataset may be referred to as being descendant from the existing dataset.

Note that the scrub queue (940) includes the value "0," indicating that dataset 0 is queued to be scrubbed. In this example, the finished list (950) represents a list of datasets that have completed scrubbing. Accordingly, after time period t=1, the finished list (950) includes a null value, indicating that no datasets have been scrubbed yet.

After time period t=2, the storage pool (910) indicates that a snapshot has been taken of dataset 1, and the current HBT is now dataset 2. Accordingly, the snapshot pointer (920) of dataset 1 has the value "2." Further, the finished list (950) includes the value "0," indicating that the scrubbing of dataset 0 is complete. As described above with reference to ST 857 of FIG. 8A, after completing the scrubbing of dataset 0, the clones pointer (930) of dataset 0 has been examined to determine that datasets 1 and 6 are descendant from dataset 0. Accordingly, the scrub queue (940) now includes the values "1, 6" indicating that datasets 1 and 6 are now queued to be scrubbed. For the sake of clarity, after the scrubbing of a dataset is completed, the snapshot pointer (920) and clones pointer (930) corresponding to the scrubbed dataset will no longer be shown in the subsequent time periods (900) of FIG. 9.

After time period t=3, the storage pool (910) is updated to reflect that a snapshot has been taken of dataset 2, and the current HBT is now dataset 3. Further, a snapshot has been taken of dataset 6, and the current version is now dataset 7. Additionally, as shown in the finished list (950), the scrubbing of dataset 1 has been completed. Accordingly, the descendant of dataset 1 (i.e., dataset 2) has been determined from the snapshot pointer (920) shown after time period t=2, and is now loaded in the scrub queue (940).

After time period t=4, a dataset 5 is cloned from dataset 2. Further, a snapshot has been taken of dataset 7, and the current HBT is now dataset 8. Note that the clones pointer (930) for dataset 2 now stores value "5," thus indicating that dataset 5 is a clone of dataset 2. Additionally, as shown in the finished list (950), the scrubbing of dataset 6 has been completed. Accordingly, the descendant of dataset 6 (i.e., dataset 7) is now loaded in the scrub queue (940).

After time period t=5, a dataset 8 has been deleted. Accordingly, the scrub queue (940) is updated to replace dataset 7 with dataset 8 (as determined using the snapshot pointer from dataset 7). Additionally, note that a clone swap of dataset 3 and dataset 5 has occurred, such that dataset 3 is now a clone of dataset 2, and dataset 2 is a snapshot of dataset 5. Further, as shown in the finished list (950), the scrubbing of dataset 2 has been completed. Accordingly, the descendants of dataset 2 (i.e., datasets 5 and 3) are now loaded in the scrub queue (940).

While the above invention has been discussed with respect to a file system managing a single HBT with multiple snapshots and clones, the invention may be extended to include implementations in which there are multiple HBTs each of which is associated with multiple snapshots and clones.

Figure 10:
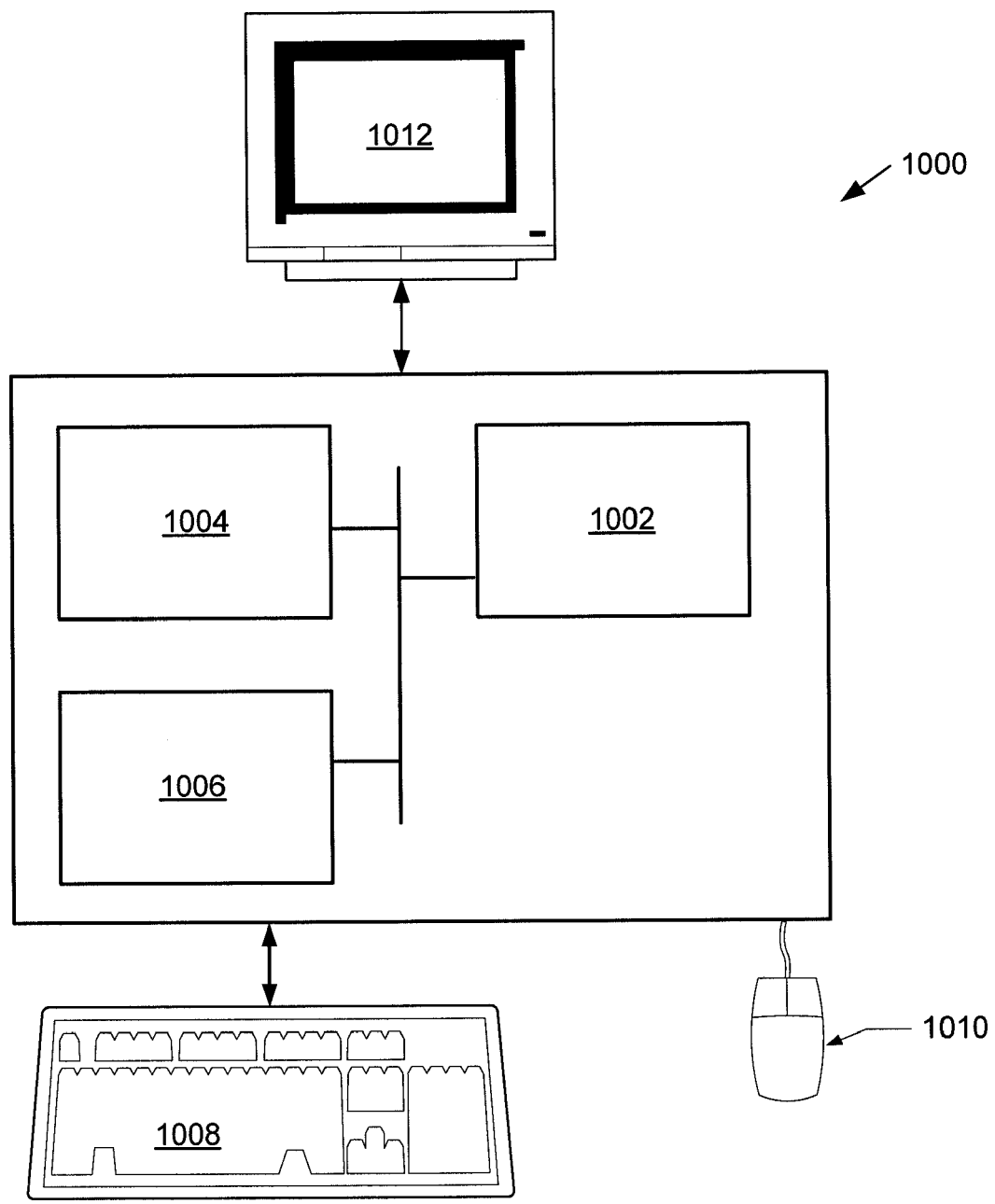
FIG. 10 shows a computer system in accordance with an embodiment of the invention.

The invention may be implemented on virtually any type of computer regardless of the platform being used. For example, as shown in FIG. 10 a networked computer system (1000) includes a processor (1002), associated memory (1004), a storage device (1006), and numerous other elements and functionalities typical of today's computers (not shown). The networked computer system (1000) may also include input means, such as a keyboard (1008) and a mouse (1010), and output means, such as a monitor (1012). The networked computer system (1000) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (1000) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable storage medium such as a compact disc (CD), a diskette, a tape, a hard drive, a flash memory drive, or any other computer readable storage device.

Embodiments of the present invention may provide a method for scrubbing datasets of a storage pool. Specifically, datasets may be ordered in a scrub queue according to birth time. While scrubbing a particular dataset, only blocks having a birth time after the birth time of the last scrubbed dataset are scrubbed. In this manner, each block may only be scrubbed once, thus reducing unnecessary and repeated scrubbing of previously scrubbed blocks.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having a computer readable program code embodied therein, the computer readable program code adapted to be executed by a processor to perform a method, the method comprising:
loading a scrub queue with a plurality of identifiers corresponding to a plurality of datasets in a storage pool;
selecting a first identifier from the scrub queue, wherein the first identifier corresponds to a first dataset, wherein the first dataset is a dataset of the plurality of datasets;
initiating a scrubbing of the first dataset, wherein the first dataset is a hierarchical block tree (HBT) comprises:
a plurality of data blocks and at least one indirect block, wherein the indirect block comprises a first block pointer that references at least one of the plurality of data blocks, and wherein the first block pointer comprises a birth time associated with the at least one of the plurality of data blocks, and
a root block comprising a second block pointer referencing the at least one indirect block, wherein the second block pointer comprises a birth time associated with the at least one indirect block; and
upon receiving an indication of a requirement to pause the scrubbing:
pausing the scrubbing of the first dataset;
creating a bookmark recording of a last location within the first dataset that was scrubbed before pausing the scrubbing of the first dataset;
detecting at least one change among the plurality of datasets in the storage pool; and
performing a modification to one of the plurality of identifiers in the scrub queue in response to detecting the at least one change.

2. The non-transitory computer readable storage medium of claim 1, wherein scrubbing the first dataset comprises scrubbing only blocks having a birth time after a birth time of a previously scrubbed dataset.

3. The non-transitory computer readable storage medium of claim 1, wherein scrubbing the first dataset comprises validating that a checksum is correct, wherein the checksum is associated with at least one selected from a group comprising a data block and an indirect block.

4. The non-transitory computer readable storage medium of claim 1, wherein scrubbing the first dataset comprises resilvering at least one selected from a group comprising a data block and an indirect block.

5. The non-transitory computer readable storage medium of claim 1, further comprising, upon completing the scrubbing of the first dataset:
removing the first identifier from the scrub queue.

6. The non-transitory computer readable storage medium of claim 5, further comprising:
selecting a second identifier from the scrub queue, wherein the second identifier corresponds to the oldest dataset remaining in the scrub queue.

7. The non-transitory computer readable storage medium of claim 1, wherein the storage pool comprises at least one physical disk.

8. The non-transitory computer readable storage medium of claim 1, wherein each of the plurality of datasets is associated with a plurality of pointers comprising:
a snapshot pointer; and
a clones pointer.

9. The non-transitory computer readable storage medium of claim 8, wherein detecting the at least one change to the storage pool comprises detecting a deletion of the first dataset from the storage pool, and wherein performing the modification comprises:
determining, based on a snapshot pointer associated with the first dataset, a descendant dataset of the first dataset;
resetting the bookmark to a beginning of the descendant dataset; and
initiating a scrubbing of the descendant dataset according to the bookmark.

10. The non-transitory computer readable storage medium of claim 8, wherein detecting the at least one change to the storage pool comprises detecting a deletion of a second dataset from the storage pool, and wherein performing the modification comprises:
determining, based on a snapshot pointer associated with the second dataset, a descendant dataset of the second dataset;
replacing, within the scrub queue, an identifier corresponding to the second dataset with an identifier corresponding to the descendant dataset; and
resuming the scrubbing of the first dataset according to the bookmark.

11. The non-transitory computer readable storage medium of claim 8, wherein detecting the at least one change to the storage pool comprises detecting a clone swap between the first dataset and a clone dataset, and wherein performing the modification comprises:
swapping an identifier of the first dataset with an identifier of the clone dataset;
resetting the bookmark to a beginning of the clone dataset; and
initiating a scrubbing of the clone dataset according to the bookmark.

12. The non-transitory computer readable storage medium of claim 1, wherein detecting the at least one change to the storage pool comprises detecting that a snapshot has been created from the first dataset, and wherein performing the modification comprises initiating a scrubbing of the snapshot according to the bookmark.

13. The non-transitory computer readable storage medium of claim 1, wherein detecting the at least one change to the storage pool comprises detecting that a snapshot has been created from a second dataset, wherein the second dataset is associated with an identifier loaded in the scrub queue, and wherein performing the modification comprises:
replacing, within the scrub queue, the identifier associated with the second dataset with an identifier associated with the snapshot; and
resuming the scrubbing of the first dataset according to the bookmark.

14. The non-transitory computer readable storage medium of claim 1, wherein detecting the at least one change to the storage pool comprises detecting a clone swap between at least one dataset and a clone dataset, and wherein performing the modification comprises:
swapping an identifier of the at least one dataset with an identifier of the clone dataset; and
resuming the scrubbing of the first dataset according to the bookmark.

15. A system, comprising:
a processor;
a computer readable storage medium having computer readable program code embodied therein, the computer readable program code adapted to, when executed by the processor, implement a method, the method comprising:
loading a scrub queue with a plurality of identifiers corresponding to a plurality of datasets to be scrubbed, wherein the plurality of datasets are stored in a storage pool;

selecting a first identifier from the scrub queue, wherein the first identifier corresponds to a first dataset, wherein the first dataset is an oldest dataset of the plurality of datasets;

initiating a scrubbing of the first dataset, wherein the first dataset is a hierarchical block tree (HBT) comprises:

a plurality of data blocks and at least one indirect block, wherein the indirect block comprises a first block pointer that references at least one of the plurality of data blocks, and wherein the first block pointer comprises a birth time associated with the at least one of the plurality of data blocks, and a root block comprising a second block pointer referencing the at least one indirect block, wherein the second block pointer comprises a birth time associated with the at least one indirect block; and upon receiving an indication of a requirement to pause the scrubbing:

pausing the scrubbing of the first dataset;

creating a bookmark recording of a last location within the first dataset that was scrubbed before pausing the scrubbing of the first dataset;

detecting at least one change among the plurality of datasets in the storage pool; and performing a modification to one of the plurality of identifiers in the scrub queue in response to detecting the at least one change.

16. The system of claim 15, wherein scrubbing the first dataset comprises validating that a checksum is correct, wherein the checksum is associated with at least one selected from a group comprising a data block and an indirect block.

17. The system of claim 15, wherein the bookmark comprises the first identifier, an object identifier corresponding to a file in a dataset being scrubbed prior to pausing the scrubbing, a level identifier of the dataset being scrubbed prior to pausing the scrubbing, and a block identifier corresponding to the block within the level being scrubbed prior to pausing the scrubbing.

* * * * *